US010853315B1

(12) United States Patent
Faibish et al.

(10) Patent No.: US 10,853,315 B1
(45) Date of Patent: Dec. 1, 2020

(54) MULTI-TIER STORAGE SYSTEM CONFIGURED FOR EFFICIENT MANAGEMENT OF SMALL FILES ASSOCIATED WITH INTERNET OF THINGS

(71) Applicant: EMC Corporation, Hopkinton, MA (US)

(72) Inventors: Sorin Faibish, Newton, MA (US); John M. Bent, Los Alamos, NM (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1111 days.

(21) Appl. No.: 15/064,314

(22) Filed: Mar. 8, 2016

(51) Int. Cl.
*G06F 16/13* (2019.01)
*G06F 16/182* (2019.01)
*G06F 16/11* (2019.01)

(52) U.S. Cl.
CPC .............. *G06F 16/13* (2019.01); *G06F 16/11* (2019.01); *G06F 16/1824* (2019.01)

(58) Field of Classification Search
CPC .... G06F 17/30091; G06F 16/11; G06F 16/13; G06F 16/1824
See application file for complete search history.

(56) References Cited

U.S. PATENT DOCUMENTS

| 5,678,046 | A  | * | 10/1997 | Cahill ..................... G06K 9/033 707/829 |
| 6,397,228 | B1 | * | 5/2002  | Lamburt ................. G06F 16/25 707/692 |
| 7,103,740 | B1 | * | 9/2006  | Colgrove .............. G06F 3/0605 707/999.202 |
| 7,720,818 | B1 | * | 5/2010  | Laura ..................... G06Q 40/02 707/609 |
| 8,825,652 | B1 |   | 9/2014  | Faibish et al. |
| 8,972,465 | B1 |   | 3/2015  | Faibish et al. |
| 8,977,814 | B1 | * | 3/2015  | Ostapovicz ............. G06F 12/08 711/117 |
| 9,165,015 | B2 | * | 10/2015 | Kauffman ......... G06F 17/30091 |
| 9,223,800 | B1 |   | 12/2015 | Faibish et al. |
| 9,600,493 | B1 | * | 3/2017  | Hasegawa ......... G06F 17/30221 |

(Continued)

OTHER PUBLICATIONS

C. Yan et al., "Hmfs: Efficient Support of Small Files Processing over HDFS," Algorithms and Architectures for Parallel Processing: Lecture Notes and Computer Science, Aug. 2014, pp. 54-67, vol. 8631.

(Continued)

*Primary Examiner* — Irete F Ehichioya
*Assistant Examiner* — Huen Wong
(74) *Attorney, Agent, or Firm* — Ryan, Mason & Lewis, LLP

(57) ABSTRACT

An apparatus in one embodiment comprises a multi-tier storage system having at least a front-end storage tier, a back-end storage tier and a data mover module configured to control movement of data between the storage tiers. The multi-tier storage system is configured to receive a plurality of files, such as relatively small size files containing data from respective Internet of Things (IoT) devices. The front-end storage tier comprises a file system and at least one key-value store. The multi-tier storage system is configured to combine multiple ones of the received files written to at least one specified directory of the file system into an object for storage in association with a key in the key-value store. The object comprises multiple sub-keys identifying respective ones of the multiple files within the object. The data mover module may be configured to copy the object from the key-value store to the directory.

20 Claims, 4 Drawing Sheets

(56) References Cited

U.S. PATENT DOCUMENTS

| | | | | |
|---|---|---|---|---|
| 2007/0185934 | A1* | 8/2007 | Cannon | G06F 11/1469 |
| 2008/0005147 | A1* | 1/2008 | Khushraj | G06F 16/36 |
| 2008/0161885 | A1* | 7/2008 | Hsu | G06F 3/061 |
| | | | | 607/60 |
| 2008/0177807 | A1* | 7/2008 | Dile | G06F 11/1451 |
| 2009/0060201 | A1* | 3/2009 | Rhodes | G06F 21/62 |
| | | | | 380/279 |
| 2011/0258225 | A1* | 10/2011 | Taylor | G06F 17/30336 |
| | | | | 707/769 |
| 2011/0320733 | A1* | 12/2011 | Sanford | G06F 12/0871 |
| | | | | 711/135 |
| 2013/0227194 | A1 | 8/2013 | Kannan et al. | |
| 2013/0290598 | A1* | 10/2013 | Fiske | G06F 3/0625 |
| | | | | 711/103 |
| 2014/0046904 | A1* | 2/2014 | Kumarasamy | G06F 3/0619 |
| | | | | 707/652 |
| 2014/0181400 | A1* | 6/2014 | Lin | G06F 3/0613 |
| | | | | 711/114 |
| 2016/0048542 | A1* | 2/2016 | Gluzman Peregrine | |
| | | | | G06F 17/30303 |
| | | | | 707/692 |

OTHER PUBLICATIONS

The Apache Software Foundation, "Hadoop Archives Guide," https://hadoop.apache.org/docs/rl.2.1/hadoop_archives.html, 2008, 4 pages.

U.S. Appl. No. 14/871,160 filed in the name of S. Faibish et al. on Sep. 30, 2015 and entitled "Translation-Based Name Node Configuration for Object Access in a Multi-Tier Storage System.".

"EMC 2 Tiers Solution Prototype," http://veddiew.typepad.com/blog/2015/05/emc-two-tiers-storage-solution-prototype.html, Sep. 25, 2015, 2 pages.

EMC Corporation, "EMC Tiered Storage for SAP: a New Way to Optimize with Use Cases for EMC Symmetrix VMAX with FAST and Virtual LUN," White Paper, Applied Technology, May 2010, 14 pages.

EMC Corporation, "EMC ScaleIO," V1.32, User Guide, #302-001-033, Rev. 11, May 2015, 536 pages.

EMC Corporation, "EMC 2-Tiers—POSIX Namespace for 2nd and 3rd Platform Storage Systems," Dec. 2015, 3 pages.

EMC Corporation, "EMC Elastic Cloud Storage—Software-Defined Object Storage—Cloud-Scale Capabilities and Economics," EMC Data Sheet, Oct. 2015, 4 pages.

EMC Corporation, "EMC ATMOS Cloud Storage—a Platform to Store, Archive, and Access Unstructured Data at Scale—Data, Application, Access Demands," EMC Data Sheet, Sep. 2014, 3 pages.

EMC Corporation, "Technical White Paper: Elastic Cloud Storage Software Atchitecture—Deploy a Modern Hyperscale Storage Platform on Commodity Infrastructure," EMC White Paper, Feb. 2015, 12 pages.

EMC Corporation, "EMC ScaleIO Operation Overview—Ensuring Non-Disruptive Operation and Upgrade," EMC White Paper, Mar. 2015, 10 pages.

* cited by examiner

US 10,853,315 B1

MULTI-TIER STORAGE SYSTEM CONFIGURED FOR EFFICIENT MANAGEMENT OF SMALL FILES ASSOCIATED WITH INTERNET OF THINGS

FIELD

The field relates generally to information processing systems, and more particularly to storage in information processing systems.

BACKGROUND

Storage systems are often configured to include multiple storage tiers, with different ones of the tiers providing different levels of input-output (TO) performance or other characteristics. In such systems, data may be moved from one tier to another within a given storage system based on access frequency of the data or other factors.

These and other types of storage systems may incorporate one or more object stores. In an object store, data is exposed and managed in the form of objects instead of files or blocks. Different objects can include different amounts and types of unstructured data but each object is identified by a globally unique identifier. Objects can therefore be stored in a flat address space such as a storage pool. The unique identifier of a given object allows an application or other requesting entity to retrieve that object without needing to know the physical location in which the object is stored. Accordingly, object stores abstract away complexities associated with lower level storage functions. Object stores are commonly utilized in cloud storage environments and numerous other storage applications.

Despite the advantages associated with storage tiering and object stores, additional improvements are needed in terms of data access performance and scalability, particularly for storage implemented in information processing systems that include potentially large numbers of compute nodes.

Moreover, performance and scalability can be adversely impacted in storage systems that process potentially extremely large numbers of relatively small files that contain data generated by distributed sensors, smart appliances, smart automobiles or other types and arrangements of devices associated with the Internet of Things (IoT). For example, processing large numbers of small files containing IoT data can lead to substantial processing bottlenecks in a typical multi-tier storage system, resulting in degraded performance.

SUMMARY

Illustrative embodiments of the present invention provide information processing systems that include multi-tier storage systems in which high levels of performance can be achieved when processing extremely large numbers of relatively small files, such as those containing data from distributed sensors, smart appliances, smart automobiles or other types and arrangements of one or more IoT devices.

In one embodiment, an apparatus comprises a multi-tier storage system having at least a front-end storage tier, a back-end storage tier and a data mover module configured to control movement of data between the storage tiers. The multi-tier storage system is configured to receive a plurality of files, such as relatively small size files containing data from respective IoT devices. The front-end storage tier comprises a file system and at least one key-value store. The multi-tier storage system is configured to combine multiple ones of the received files written to at least one specified directory of the file system into an object for storage in association with a key in the key-value store. The object comprises multiple sub-keys identifying respective ones of the multiple files within the object.

By way of example, the received files may be provided to the multi-tier storage system by one or more IoT servers or other types of IoT nodes over at least one network, with the received files containing data from respective ones of a plurality of IoT devices coupled to the one or more IoT nodes.

The data mover module may be configured to copy the object from the key-value store to the directory and to store the copied object as one or more blocks in the back-end storage tier. The data mover module may be further configured to perform tar and compression operations in conjunction with copying of the object from the key-value store to the directory and storing of the copied object as one or more blocks in the back-end storage tier. Such tar and compression operations are illustratively applied separately to each of the one or more blocks of the object. In embodiments in which the back-end storage tier comprises a Hadoop Distributed File System (HDFS), the object may be stored in the back-end storage tier as one or more maximum-size HDFS file blocks.

In some embodiments, the front-end and back-end storage tiers comprise respective ones of a fast tier and a capacity tier in a 2 TIERS™ storage system, although other types of multi-tier storage systems can be used in other embodiments.

Illustrative embodiments can provide significant improvements in terms of data access performance and scalability relative to conventional arrangements, particularly when processing extremely large numbers of relatively small files. For example, processing bottlenecks can be avoided and enhanced throughput performance achieved when processing small files containing IoT data.

These and other illustrative embodiments include, without limitation, apparatus, systems, methods and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
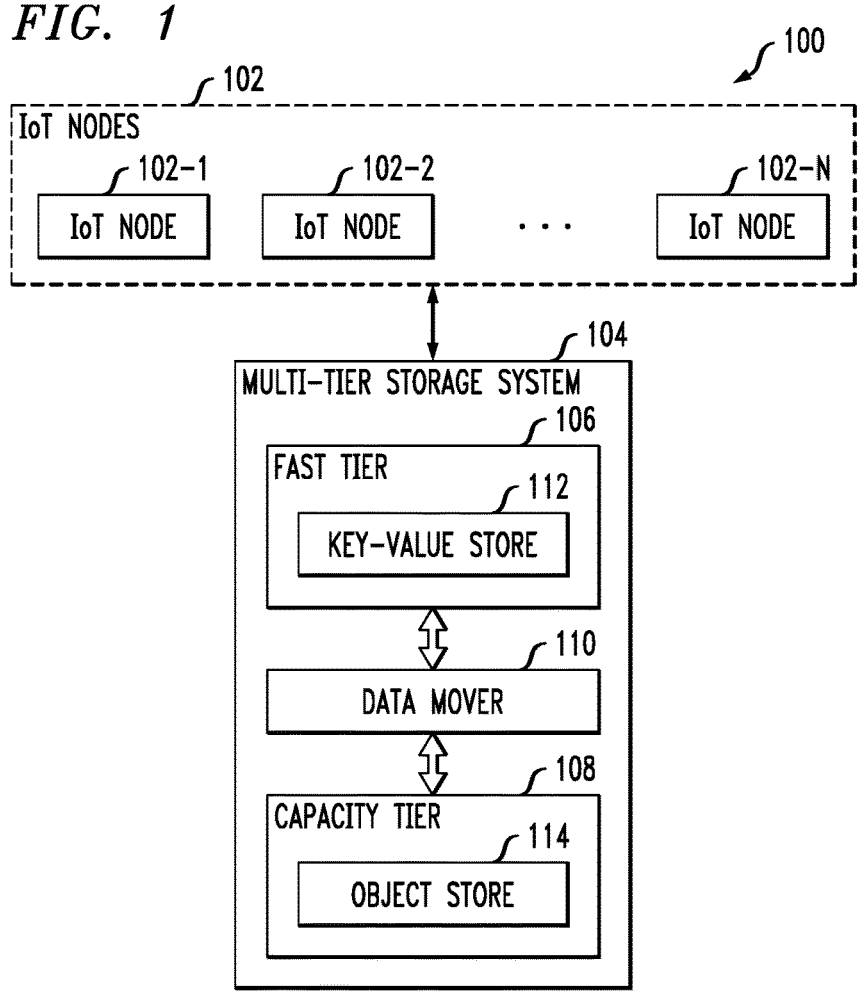
FIG. 1 is a block diagram of an information processing system comprising a multi-tier storage system configured for efficient management of small files containing IoT data in an illustrative embodiment of the invention.

FIG. 1 shows an information processing system 100 configured in accordance with an illustrative embodiment of the present invention. The information processing system 100 comprises a plurality of IoT nodes 102, individually denoted as 102-1, 102-2, . . . 102-N, which access a multi-tier storage system 104. The multi-tier storage system 104 comprises a fast tier 106, a capacity tier 108, and a data mover module 110 coupled to the fast and capacity tiers 106 and 108 and configured to control movement of data between those storage tiers. The fast and capacity tiers 106 and 108 are examples of what are more generally referred to herein as respective "front-end" and "back-end" storage tiers of the multi-tier storage system 104. Other types of storage tiering arrangements involving two or more distinct storage tiers can be used in other embodiments. Also, multiple instances of the data mover module 110 can be included in a given embodiment.

In the FIG. 1 embodiment, the fast tier 106 illustratively comprises a key-value store 112 and the capacity tier 108 illustratively comprises an object store 114. Although only single instances of the stores 112 and 114 are shown in the respective tiers 106 and 108, other embodiments can be configured in which the fast tier 106 comprises multiple key-value stores, the capacity tier 108 comprises multiple object stores, or both. The fast tier 106 is also assumed to comprise at least one file system. The capacity tier 108 in some embodiments also comprises at least one file system.

The multi-tier storage system 104 receives files from the IoT nodes 102 and is configured to combine multiple ones of the received files that are written to at least one specified directory of the file system of the fast tier 106 into an object for storage in association with a key in the key-value store 112. The object comprises multiple sub-keys identifying respective ones of the multiple files within the object. The specified directory illustratively comprises a small file directory, which may be a particular directory configured to receive small files having a file size at or below a specified threshold.

The files received by the multi-tier storage system 104 from one or more of the IoT nodes 102 are illustratively received over at least one network that is not explicitly shown in the figure. The received files may include, for example, data from respective ones of a plurality of IoT devices coupled to one or more of the IoT nodes 102. Such IoT devices may include distributed sensors, smart appliances, smart automobiles or other types and arrangements of one or more devices that generate various types of IoT data that is to be stored in the multi-tier storage system 104.

It is to be appreciated that the term "IoT node" as used herein is intended to be broadly construed, and may in some embodiments comprise an IoT device or other type of device that serves as a source for IoT data. Other types of processing devices that stream or otherwise process IoT data may additionally or alternatively be considered IoT nodes as that term is broadly used herein.

For example, one or more of the IoT nodes 102 may illustratively comprise an IoT server that streams IoT data in the form of relatively small files to the multi-tier storage system 104. In some embodiments, the IoT data files may each be on the order of about 100 bytes up to about 10 kilobytes (KB), although other relatively small file sizes may be used in other embodiments. Such files are considered "small" compared to the size of objects or associated file blocks that are typically handled by the capacity tier 108. As another example, in illustrative embodiments that utilize Linux block sizes, the relatively small files may be more particularly between about 100 bytes and 4 KB.

The data mover module 110 may be configured to identify the multiple files to be combined into a given object from among a larger number of received files. More particularly, the data mover module 110 can identify the multiple files to be combined into the object as those files that each have a file size at or below a specified threshold, such as 4 KB, 10 KB or another relatively small file size threshold. The data mover module 110 can write the multiple files that are so identified to a particular file system directory of the fast tier 106 before combining the multiple files into the object. Accordingly, in some embodiments, the data mover module 110 directs particular received files having a file size at or below a specified threshold into at least one particular directory of the file system of the fast tier 106. In other embodiments, IoT nodes or other system components can be configured to write files having a file size at or below the specified threshold into the particular directory.

The object generated by combining multiple ones of the received files may comprise a binary large object ("blob") with the multiple sub-keys identifying respective offsets of the multiple files within the binary large object. The object may comprise a large number of the relatively small IoT data files. For example, in some embodiments, the size of the object is on the order of 10 gigabytes (GB) and contains up to a million or more of the relatively small IoT data files.

The data mover module 110 in the present embodiment is configured to copy the object from the key-value store 112 to the particular directory of the fast tier 106 and to store the copied object in the object store 114 of the capacity tier 108. In conjunction with this copying and storage, the data mover module 110 may be further configured to perform tar and compression operations. For example, the tar and compression operations in some embodiments are applied separately to each of one or more blocks of the object. The term "tar" is derived from "tape archive" and more generally refers to collecting multiple files into an archive file for storage or distribution, also referred to as a "tarball."

In some embodiments, the capacity tier 108 implements an HDFS, with the object being stored in the back-end storage tier as one or more maximum-size HDFS file blocks. For example, such maximum-size storage blocks in current HDFS implementations are typically 64 megabytes (MB). Accordingly, the above-noted object having a size on the order of 10 GB can be stored using a corresponding number of 64 MB HDFS file blocks.

The data mover module 110 illustratively comprises a synchronizer service component that accesses the key-value store 112 of the fast tier 106 via a direct memory application programming interface (API). For example, in embodiments in which the fast tier 106 and capacity tier 108 comprise respective fast and capacity tiers of a 2 TIERS™ storage system from EMC Corporation of Hopkinton, Mass., the synchronizer service component may comprise a SYNCer tiering software component of the 2 TIERS™ storage system and the direct memory API may comprise a Flood™ direct memory API of the 2 TIERS™ storage system. Other types of synchronizer service components and direct memory APIs can be used in other embodiments, as will be appreciated by those skilled in the art. The synchronizer service component can be configured to provide the multiple files to the key-value store 112 via the direct memory API for combination into the object.

The data mover module 110 is further configured to retrieve the object from the capacity tier 108 into the fast tier 106 with the sub-keys being utilized to access respective ones of the multiple files of the object.

Although not explicitly shown in FIG. 1, compute nodes, IO nodes or other types of nodes may be incorporated into the information processing system 100 in addition to or in place of at least a subset of the IoT nodes 102. It is also possible that one or more of the IoT nodes 102 may be implemented as respective compute nodes or IO nodes, or as portions of such nodes. Numerous alternative arrangements of compute nodes, IO nodes, IoT nodes and other types of nodes are possible in other embodiments.

By way of example, the fast tier 106 in some embodiments may comprise portions of respective memories of one or more compute nodes or one or more IO nodes. Such portions of the respective memories of the one or more compute nodes or the one or more input-output nodes may comprise respective flash memories of those nodes. Alternative arrangements are possible. For example, the portions of the respective memories may comprise respective dynamic random access memories (DRAMs), or various combinations of flash, DRAM or other types of electronic memory. Other types and arrangements of node memories may be used to form at least a portion of the fast tier 106.

The compute nodes in some embodiments comprise respective analysis nodes that run respective analytics applications utilizing data stored in the fast tier 106 and one or more other tiers of the multi-tier storage system. Numerous other types of compute nodes can be used in other embodiments, including various combinations of multiple compute nodes of different types. For example, at least a subset of the compute nodes in some implementations can comprise virtual machines or containers running in cloud infrastructure.

The fast tier 106 in some embodiments incorporates or otherwise supports analytics functionality utilized by the compute nodes. For example, the fast tier 106 may comprise an in-memory database analytics engine such as SAP HANA that comprises a relational database management system.

The analytics functionality can alternatively be provided using in-memory data analytics products such as Tachyon. Numerous other types of analytics functionality can be provided using fast tier 106 in other embodiments. The file system of the fast tier 106 can be configured to support Tachyon in-memory data analytics or other types of in-memory data analytics functionality of the fast tier 106.

The compute nodes may be interconnected with one another using high-speed connections. For example, data can be moved between the compute nodes using remote direct memory access (RDMA) connections over InfiniBand or Gigabit Ethernet. Numerous other types of connections and associated data transfer protocols can be used in other embodiments.

In some embodiments, at least portions of one or both of the fast tier 106 and the capacity tier 108 of the multi-tier storage system 104 can be implemented using software-defined storage products such as ScaleIO™ or ViPR® both of which are commercially available from EMC Corporation of Hopkinton, Mass.

For example, some implementations can utilize ScaleIO™ as a software-defined storage controller to advantageously support hundreds or thousands of compute nodes, potentially providing a single memory pool with a capacity on the order of a petabyte (PB). Such an arrangement overcomes scalability limitations inherent in certain conventional systems used to implement in-memory data analytics functionality with SAP HANA or Tachyon. Also, failure protection functionality provided by ScaleIO™ can be used to protect the fast tier 106 from failures in one or more of the compute nodes.

Additional details regarding ScaleIO™ functionality that can be incorporated into a software-defined storage controller in illustrative embodiments can be found in, for example, EMC ScaleIO™ User Guide, V1.32, Document No. 302-001-033, Rev. 11, May 2015, which is incorporated by reference herein.

The object store 114 is configured to store data in the form of objects having respective object identifiers (OIDs). A specified set of objects stored in the object store 114 may be made accessible to an application running on a compute node or other type of node via a corresponding dynamically loadable namespace (DLN) identifier. The DLN identifier is associated with a DLN object stored in the object store, with the DLN object comprising identifiers of respective ones of the objects in the specified set.

For example, the object comprising a combination of multiple relatively small files written to a specified directory of the fast tier 106 may be made accessible to a given analytics application running on a compute node via a corresponding DLN identifier.

In some embodiments, a translator at least partially incorporated in or otherwise associated with the multi-tier storage system 104 implements a plurality of translation services and one or more index tables. A given one of the translation services is configured to access at least one of the one or more index tables in order to determine a DLN identifier associated with an application running on a compute node, and to instantiate a name node corresponding to the DLN identifier. Particular objects of the given object store 114 of the capacity tier 108 are made accessible to the application via the name node. The translator via the translation services and the at least one index table permits applications running on respective compute nodes having no knowledge of the object storage structure of the given object store to access a specified set of objects corresponding to the DLN identifier.

Such arrangements allow for translation-based controlled partitioning of an object store such that an individual application can access only a limited number of the objects associated with a corresponding dynamically loadable namespace. However, the total number of objects that can be controlled across multiple applications using respective dynamically loadable namespaces is essentially unlimited. Accordingly, some embodiments are scalable to essentially unlimited numbers of objects that may be stored in one or more object stores of at least one back-end storage tier. Also, the use of one or more index tables each of which can illustratively be configured as a superblock index table object allows all of the objects of the object store to be addressed as a unified namespace.

Additional details regarding accessing objects of an object store utilizing DLNs can be found in U.S. patent application Ser. No. 14/871,160, filed and entitled "Translation-Based Name Node Configuration for Object Access in a Multi-Tier Storage System," which is commonly assigned herewith and incorporated by reference herein.

It should be noted that software-defined storage may also be used for the object store 114 or other portions of the capacity tier 108.

The fast tier 106, capacity tier 108 and data mover module 110 are all assumed to be part of the multi-tier storage system 104 of information processing system 100, although other arrangements are possible in other embodiments. Also, it should be noted that components such as data mover module 110 that are shown as separate from the fast tier 106 and capacity tier 108 in the FIG. 1 embodiment can be implemented at least in part within at least one of the tiers. For example, the data mover module 110 in some embodiments can be implemented in a distributed manner using compute nodes, IO nodes, IoT nodes or other types of nodes that are used to implement portions of the fast tier 106.

A given "IO node" as the term is used herein is intended to encompass a data node, a metadata node, or another type of node providing access to at least one of data and metadata for one or more associated compute nodes. The term "compute node" is also intended to be broadly construed, and generally encompasses a system node that runs at least a portion of at least one application.

It is assumed that the fast tier 106 has a relatively high input-output processing speed and a relatively low capacity and the capacity tier 108 has a relatively low input-output processing speed and a relatively high capacity, although other types of multi-tier storage systems can be used in other embodiments.

As mentioned previously, the data mover module 110 is illustratively coupled to the storage tiers and configured to control transfer of data between the storage tiers. The term "data movement" as used in this and other contexts herein is intended to be broadly construed, so as to encompass data migration as well as other types of movement of data between storage tiers. A given data mover module can be implemented at least in part on storage arrays or other storage platforms that implement at least portions of one or more of the storage tiers of the multi-tier storage system 104.

Each of at least a subset of the storage tiers of a multi-tier storage system comprises a plurality of storage drives with different types of storage drives being used in different ones of the storage tiers. For example, a fast tier may comprise flash drives while a capacity tier comprises disk drives. The particular storage drives used in a given storage tier may be varied in other embodiments, and multiple distinct storage drive types may be used within a single storage tier. The term "storage drive" as used herein is intended to be broadly construed, so as to encompass, for example, disk drives, flash drives, solid state drives, hybrid drives or other types of storage products and devices.

The storage drives utilized in the fast tier 106 are generally significantly faster in terms of read and write access times than the drives utilized in the capacity tier 108. Accordingly, the fast tier 106 in some embodiments is a relatively small storage tier optimized for IO processing speed, while the capacity tier 108 is a relatively large but slower storage tier optimized for storage capacity. Terms such as "fast" and "slow" in this context are relative terms and not intended to denote any particular absolute performance level. However, numerous alternative tiering arrangements may be used, including arrangements with three or more tiers each providing a different level of performance. Also, the various tiers of a given multi-tier storage system in other embodiments need not be arranged in the particular manner illustrated in conjunction with the FIG. 1 embodiment. Accordingly, numerous alternative storage tiering arrangements can be used in other embodiments. Such alternative arrangements can include, for example, one or more intermediate storage tiers arranged between the front-end and back-end storage tiers of a multi-tier storage system.

The term "multi-tier storage system" as used herein is therefore intended to be broadly construed so as to encompass any of a wide variety of different arrangements of storage tiers. The term "storage tier" as used herein is also intended to be broadly construed, and may comprise, for example, a single storage array or a single-tier storage system.

As noted above, in some embodiments, the fast tier 106 and the capacity tier 108 of the multi-tier storage system are implemented in the form of a 2 TIERS™ storage system from EMC Corporation of Hopkinton, Mass.

By way of example, a given 2 TIERS™ storage system may comprise fast tier 106 implemented using one or more DSSD™ flash-based storage arrays, also from EMC Corporation, and capacity tier 108 comprising at least one object store 114. In such an arrangement, an IO dispatcher software layer of the 2 TIERS™ storage system may be configured, for example, to pre-fetch data from the object store 114 of the capacity tier 108 into the DSSD™ storage devices of the fast tier 106.

It should be noted that access predictions or other hints provided using analytics applications associated with in-memory data analytics products such as Tachyon can be utilized by the IO dispatcher software layer of the 2 TIERS™ storage system to provide the fastest possible access to needed data files.

A wide variety of other types of server-based flash storage devices and multi-tier storage systems can be used in other embodiments, as will be apparent to those skilled in the art. References herein to DSSD™ storage devices and the 2 TIERS™ storage system are by way of example only.

The data mover module 110 may be configured to control movement of data between the fast tier 106 and the capacity tier 108 in order to facilitate achievement of desired levels of performance by system users.

The "users" in this embodiment may refer, for example, to respective ones of a plurality of compute nodes or other types of nodes or other information processing system entities, although the term "user" as utilized herein is intended to be broadly construed so as to encompass numerous other arrangements of human, hardware, software or firmware entities, as well as combinations of such entities.

The data mover module 110 can communicate with the fast tier 106 and the capacity tier 108 via one or more networks or other types of communication media. In distributed implementations, different modules or other portions of a given distributed system component such as a distributed data mover module can be implemented in respective ones of a plurality of compute nodes, IO nodes or other types of nodes, in any combination.

As noted above, such compute nodes, IO nodes or other types of nodes of the information processing system 100 are assumed to communicate with the multi-tier storage system 104 over at least one network, which is not explicitly shown in the figure. The compute nodes may comprise respective computers in a cluster of computers associated with a supercomputer or other high performance computing (HPC) system. The term "compute node" as used herein is intended to be broadly construed, and such nodes in some embodiments may comprise respective analysis nodes or other types of compute nodes. Applications running on such nodes illustratively include what are referred to herein as "analysis applications" but such applications are also intended to be broadly construed.

Although shown as a separate component in this embodiment, the data mover module 110 in other embodiments can be implemented at least in part within the fast tier 106, the capacity tier 108 or within another system component.

As indicated previously, it is possible to implement the data mover module 110 in a distributed manner, with portions of the data mover module possibly being implemented on respective compute nodes or associated processing platforms. Other types of distributed implementations of the data mover module 110 are possible. For example, portions of the functionality of the data mover module can be implemented on respective IO nodes. The IO nodes may illustratively comprise respective servers.

It is to be appreciated that these and other features of illustrative embodiments are presented by way of example only, and should not be construed as limiting in any way.

Accordingly, different numbers, types and arrangements of nodes, front-end storage tiers, back-end storage tiers and data mover modules can be used in other embodiments.

The fast tier 106, capacity tier 108 and data mover module 110 and possibly other elements of the system 100 can be implemented using one or more storage platforms. For example, a given storage platform can comprise any of a variety of different types of storage including network-attached storage (NAS), storage area networks (SANs), direct-attached storage (DAS) and distributed DAS, as well as combinations of these and other storage types, including software-defined storage.

A given storage platform may comprise storage arrays such as VNX® and Symmetrix VMAX® storage arrays, both commercially available from EMC Corporation. Other types of storage products that can be used in implementing a given storage platform in an illustrative embodiment include the previously-mentioned software-defined storage products such as ScaleIO™ and ViPR®, and flash-based storage arrays such as DSSD™, as well as cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory, and the processing device may be implemented at least in part utilizing one or more virtual machines or other types of virtualization infrastructure such as Docker containers or other types of Linux containers (LXCs). The data mover module 110, as well as other system components, may be implemented at least in part using processing devices of such processing platforms.

For example, in a distributed implementation of the data mover module 110, the distributed portions of the data mover module can be implemented in respective LXCs running on respective compute nodes, IO nodes or other types of nodes.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 204, and is suitable for use in the system 100 but is more generally applicable to other types of systems comprising front-end and back-end storage tiers and at least one associated data mover module.

In step 200, a multi-tier storage system is provided comprising at least a front-end storage tier, a back-end storage tier and at least one data mover module configured to control movement of data between the storage tiers. In the context of the FIG. 1 embodiment, the front-end storage tier, back-end storage tier and data mover module comprise respective fast tier 106, capacity tier 108 and data mover module 110 of multi-tier storage system 104. Such a multi-tier storage system may be provided in a given embodiment, for example, by configuring the system to include the recited components.

In step 202, a plurality of files are received in the multi-tier storage system. For example, with reference to FIG. 1, the files illustratively comprise relatively small files containing IoT data that are streamed to the multi-tier storage system 104 from one or more of the IoT nodes. As mentioned previously, such IoT nodes illustratively comprise respective IoT servers coupled to the multi-tier storage system 104 via one or more networks.

In step 204, multiple ones of the received files written to at least one specified directory of a file system of the front-end storage tier are combined into an object for storage in association with a key in a key-value store of the front-end storage tier. The object comprises multiple sub-keys identifying respective ones of the multiple files within the object. Again with reference to the illustrative embodiment of FIG. 1, files written by the IoT nodes 102 to the multi-tier storage system 104 that are determined to have a size at or below a specified file size threshold may be automatically directed to a particular small file directory of the fast tier 106, possibly under the control of the data mover module 110. Additionally or alternatively, one or more of the IoT nodes 102 may be configured so as to automatically write small files having sizes below the file size threshold to a particular small file directory of the fast tier 106. In an arrangement of this type, different ones of the IoT nodes 102 may have respective distinct small file directories assigned thereto on the fast tier 106, with each of the IoT nodes 102 writing its small files to its corresponding small file directory.

Figure 2:
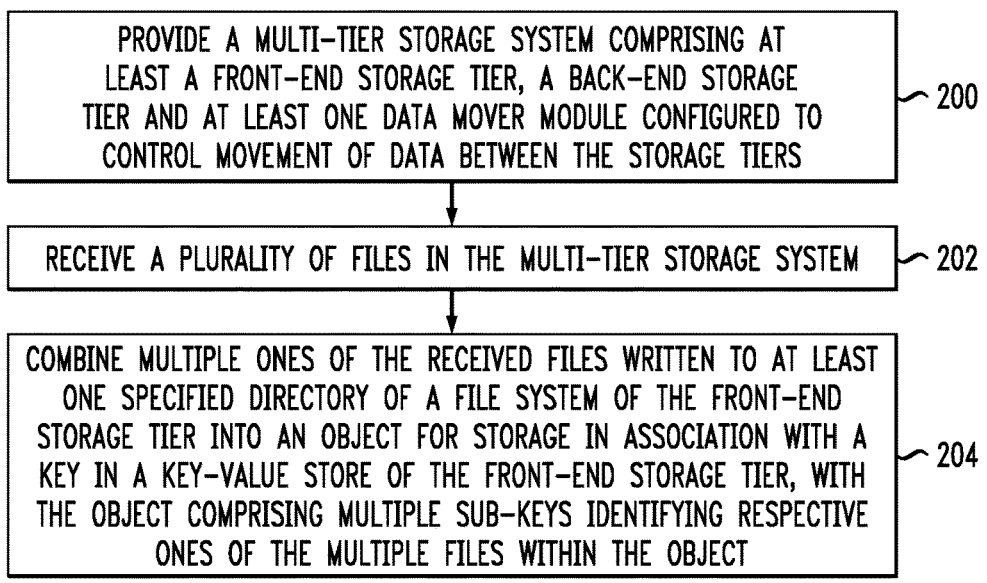
FIG. 2 is a flow diagram of an example process for efficient management of small files containing IoT data in an illustrative embodiment.

In additional operations not explicitly shown in FIG. 2, the data mover module copies the object from the key-value store of the front-end storage tier to the particular directory of the front-end storage tier, and stores the copied object in an object store of the back-end storage tier. In conjunction with such copying and storage, the data mover module may perform tar and compression operations. Such tar and compression operations in some embodiments are applied separately to each of one or more blocks of the object. Examples of these and other operations will be described in more detail below in conjunction with the illustrative embodiments of FIGS. 3 through 5.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a multi-tier storage system. For example, the ordering of the process steps may be varied in other embodiments, or certain steps may be performed concurrently with one another rather than serially. Also, one or more of the process steps may be repeated periodically, or multiple instances of the process can be performed in parallel with one another in order to implement a plurality of different multi-tier storage systems within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of information processing systems comprising multi-tier storage systems will now be described with reference to FIGS. 3 through 5. In each of these embodiments, a multi-tier storage system comprises a fast tier, a capacity tier and at least one data mover module.

Figure 3:
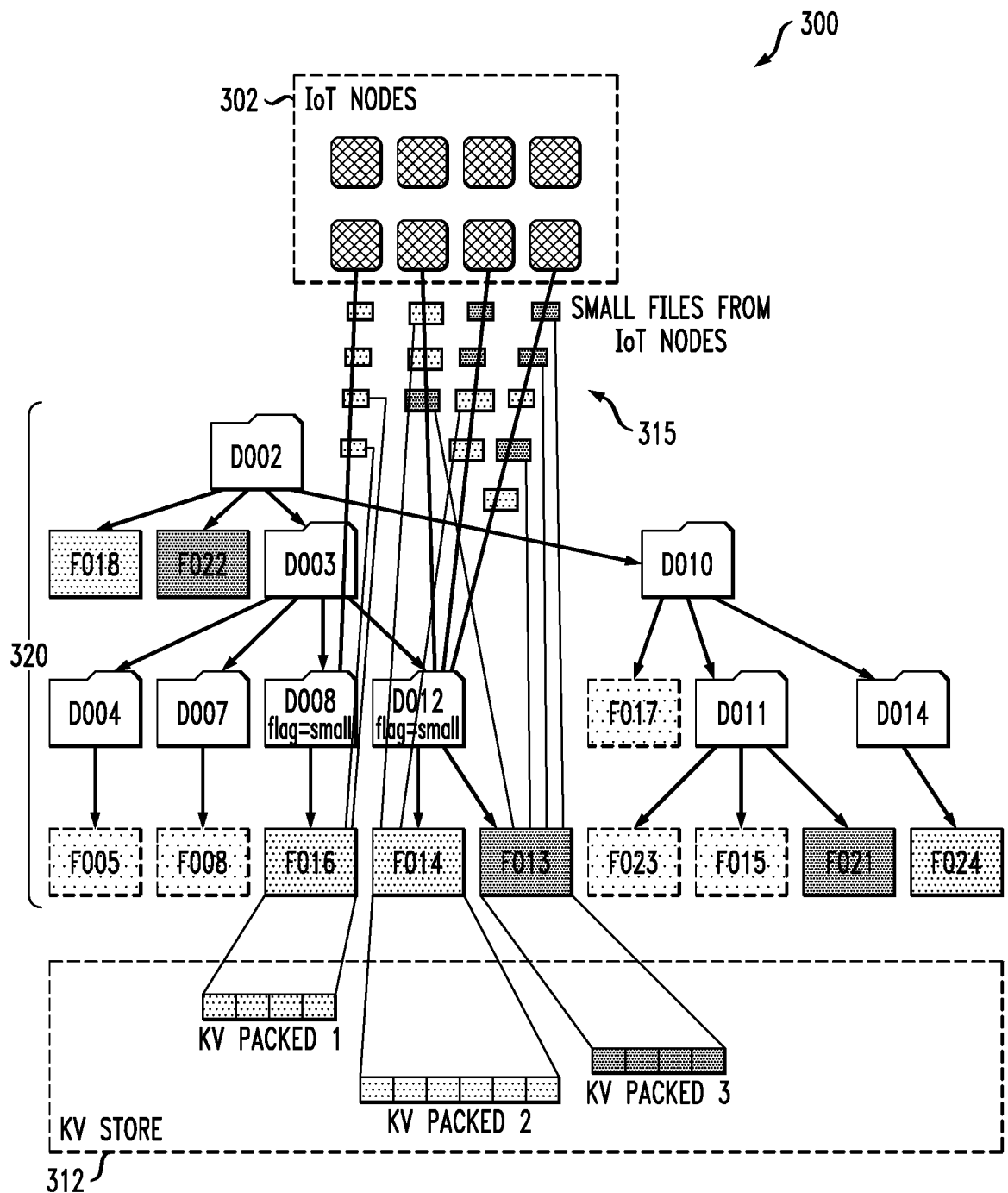
FIGS. 3, 4 and 5 show additional illustrative embodiments of multi-tier storage systems configured for efficient management of small files containing IoT data.

Referring initially to FIG. 3, an information processing system 300 comprises a key-value (KV) store 312 which is assumed to be a part of a fast tier of a multi-tier storage system. The fast tier further comprises a file system 320 having multiple numbered directories, with the number for each directory being prefixed by the letter D. These directories include directories D002, D003, D004, D007, D008, D010, D011, D012 and D014. Two of these directories, D008 and D012, are specifically designated as respective small file directories, by setting corresponding flags to a value of "small." Other directories can potentially include such small file directories, but are not explicitly designated as such in the figure. Directories of the file system 320 are generally indicated by folder shapes in the figure, while files of the file system 320 are generally indicated by rectangular shapes having a solid or dashed outline. These files are numbered with the number being prefixed by the letter F. Accordingly, the file system 320 includes a variety of different directories and files of different types. The multi-tier storage system in this embodiment is further assumed to include a capacity tier and a data mover module which are not specifically shown in the figure.

With regard to the files illustrated as part of the file system 320, a file having a dashed outline has only its metadata in the fast tier and its data in the capacity tier. Such a file is also referred to as a hyperstub, or more simply a "stub." Files of this type include F005, F008, F015, F017 and F023. A given such file is assumed to have its data in a particular object of the capacity tier identified by a corresponding OID.

When a hyperstub is accessed, it is promoted to what is referred to as a promoted file. Such a file has its data in the fast tier and in the capacity tier. Promoted files in the figure include F014, F016, F018 and F024.

Other files in the file system 320 are assumed to have been modified and therefore have to be persisted when the fast tier is unloaded. This means that their data must be copied to the capacity tier before being deleted from the fast tier. Files of this type include F013, F021 and F022. If a given one of these files was newly created since the fast tier was last loaded from the capacity tier, there is no data for the file in the capacity tier. However, if the file was existing prior to the last loading of the fast tier from the capacity tier, then the data for an older version of the file is in the capacity tier.

The IoT nodes 302 stream small files 315 containing IoT data to the fast tier of the multi-tier storage system in the FIG. 3 embodiment. Such streaming of the small files 315 illustratively occurs over one or more networks that are not explicitly shown. Certain ones of the IoT nodes 302 direct their small files to different ones of the flagged small file directories D008 and D012 as illustrated. The received small files are collected into larger files for storage in the KV store 312. For example, in this embodiment, small files collected by directory D008 form a larger file F016 that includes a portion of an object stored in the KV store 312. Similarly, small files collected by directory D012 form larger files F013 and F014 that include respective portions of an object stored in the KV store 312. The object portions in KV store 312 that correspond to respective larger files F016, F014 and F013 are denoted as respective packed KV files KVpacked1, KVpacked2 and KVpacked3 in the figure.

The object portions in KV store 312 can be combined for application of tar and compression operations. For example, assuming that object portions given by respective packed KV files KVpacked1, KVpacked2 and KVpacked3 are collectively of a size that when subject to tar and compression operations would result in a maximum-size 64 MB HDFS block, the object portions may be copied back to their respective directories of the file system 320, and the tar and compression operations can be applied. The resulting 64 MB block can then be written to the HDFS of the capacity tier.

These and other illustrative operations can be performed by or otherwise under the control of the data mover module of the multi-tier storage system. For example, in an embodiment in which the multi-tier storage system comprises a 2 TIERS™ storage system, at least the tar and compression operations can be performed by the SYNCer tiering software component of the 2 TIERS™ storage system. This component illustratively accesses the KV store 312 via a Flood™ direct memory API of the 2 TIERS™ storage system. The tar and compression operations for object portions can be performed in parallel utilizing multiple processes on the respective small file directories.

This arrangement considerably accelerates the storage of small files in the multi-tier storage system. For example, in some embodiments, the speed at which the multi-tier storage system can ingest small files is increased by multiple orders of magnitude. As a more particular illustration, assume that the capacity tier utilizes HDFS on Isilon® platform nodes such that the 64 MB blocks can be written at a rate of about 3 GB per second. If it is further assumed that there are about 100000 small files combined into each 64 MB block, the ingest speed of the small files is about 4.5 M files per second.

An analytics application running on a compute node can cause the 64 MB HDFS blocks to be reloaded into the fast tier. The sub-keys can be utilized to access respective ones of the multiple files of the object. Such operations can be performed by or otherwise under the control of the data mover module.

Figure 4:
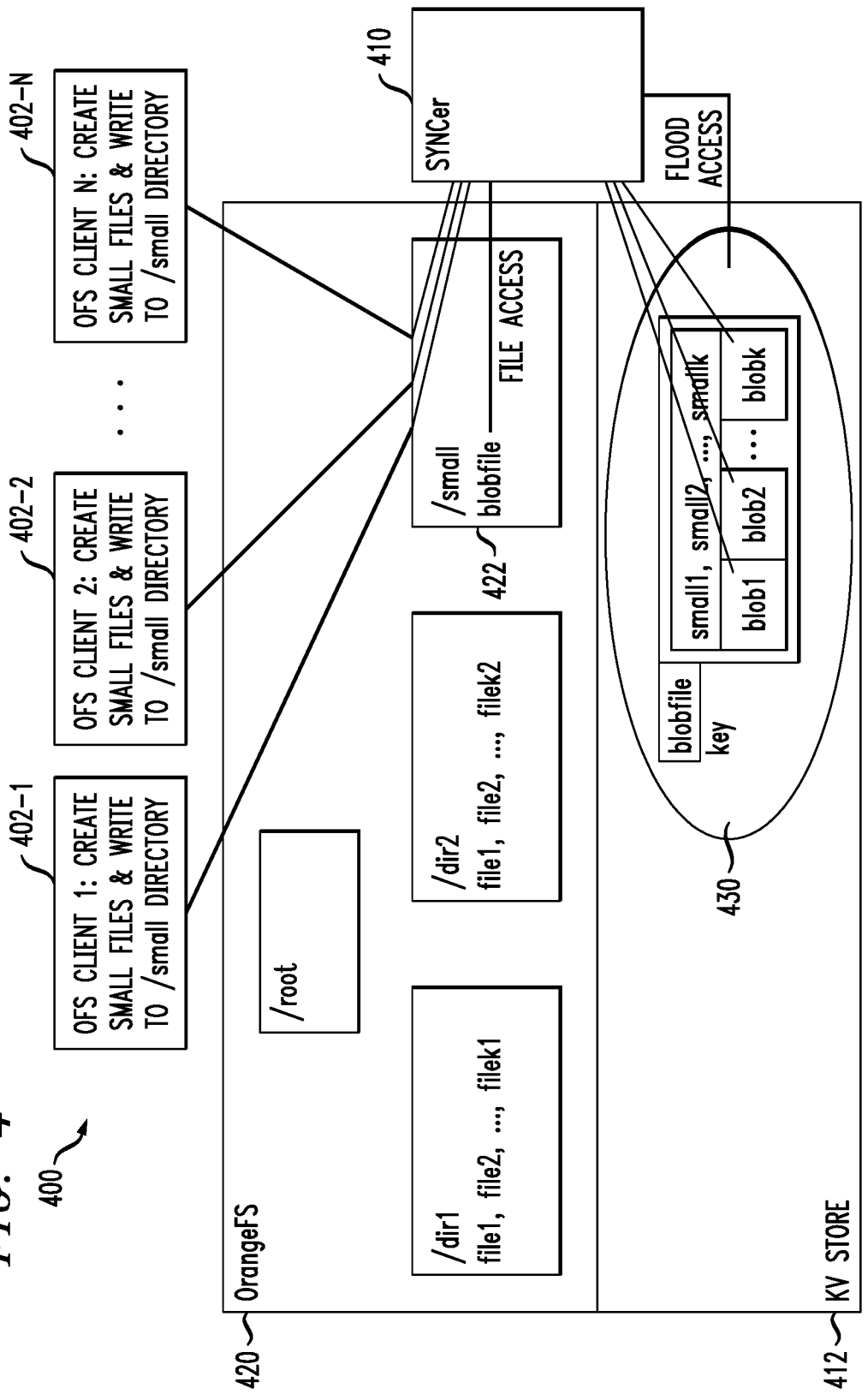

FIG. 4 shows another embodiment of an information processing system 400 comprising a plurality of IoT nodes 402-1, 402-2, . . . 402-N. The IoT nodes communicate with a multi-tier storage system that in this embodiment comprises a data mover module comprising a SYNCer component 410. The multi-tier storage system further comprises a fast tier having a KV store 412 and a file system 420. The file system 420 in this embodiment is assumed to be an Orange File System, also referred to as OrangeFS or OFS. Numerous other types of file systems can be used in the fast tier in other embodiments. The multi-tier storage system also comprises a capacity tier, although the capacity tier is not shown in the figure.

The IoT nodes 402 comprise respective OFS clients denoted client 1, client 2, . . . client N. Each of these OFS clients writes small files containing IoT data to a particular small file directory 422 of the file system 420 of the fast tier. The small file directory in this embodiment is denoted as /small. The file system 420 includes additional directories, including directories denoted /root, /dir1 and /dir2.

It is assumed in the FIG. 4 embodiment that the multi-tier storage system comprises a 2 TIERS™ storage system, with the fast tier being implemented using one or more DSSD™ flash-based storage arrays. The KV store 412 is accessible to the SYNCer component 410 via a Flood™ direct memory API of the 2 TIERS™ storage system.

As illustrated, the OFS clients running on respective ones of the IoT nodes 402 write small files containing IoT data to the /small directory of the file system 420. These small files are combined into a binary large object denoted as a blobfile. The blobfile is formed in the KV store 412 under the control of the SYNCer component 410. This involves storing the small files in the KV store as they are received from the IoT nodes 402. Multiple ones of the small files written to the /small directory are combined into the blobfile which is stored in association with a key in the KV store 412. The blobfile and its associated key are indicated by reference numeral 430. The blobfile comprises multiple sub-keys identifying respective ones of the multiple files within the blobfile. For example, small files denoted small1, small2, . . . smallk have respective sub-keys that identify their respective positions within the blobfile. These are denoted blob1, blob2, . . . blobk, respectively. As mentioned previously, the SYNCer component 410 accesses the KV store 412 via a Flood™ direct memory API.

Figure 5:
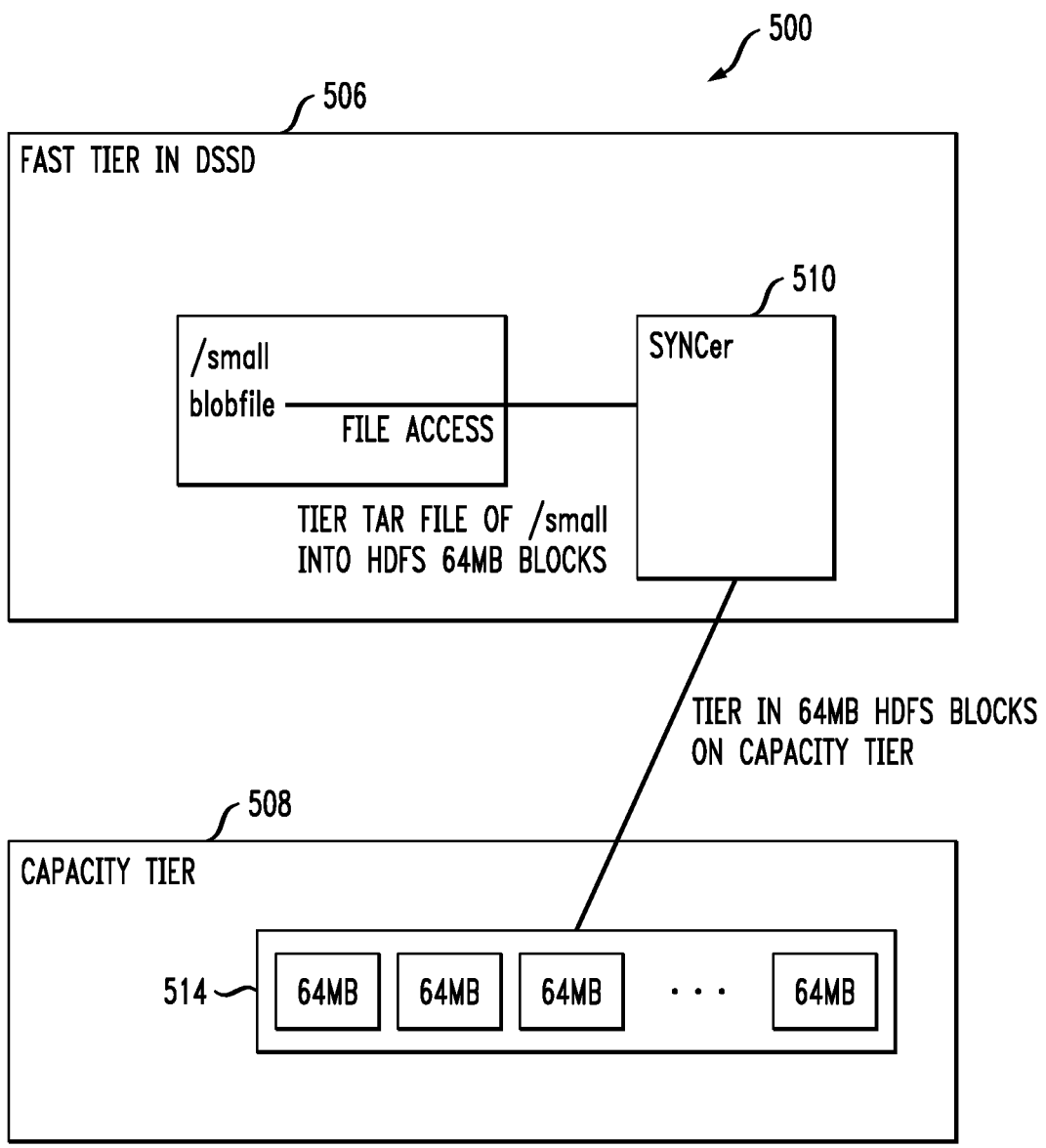

Referring now to FIG. 5, an information processing system 500 includes a multi-tier storage system comprising a fast tier 506 and a capacity tier 508. The multi-tier storage system further includes a data mover module comprising a SYNCer component 510. The SYNCer component is implemented within the fast tier 506 in this embodiment. It is further assumed that, as in the FIG. 4 embodiment, the multi-tier storage system comprises a 2 TIERS™ storage system, with the fast tier being implemented using one or more DSSD™ flash-based storage arrays. The fast tier 506 comprises a file system that includes a small file directory denoted /small as indicated. The SYNCer component in this embodiment is configured to copy a blobfile containing a combination of multiple small files from a key-value store of the fast tier 506 back into the /small directory, and to store the copied blobfile in an object store 514 of the capacity tier 508 as an object comprising multiple 64 MB HDFS file blocks. The 64 MB HDFS file blocks are illustratively segments of an HDFS file, as opposed to blocks of a type suitable for storage on a block storage device. Such HDFS file blocks in this embodiment comprise portions of an object stored in the object store 514 of the capacity tier 508.

In conjunction with the copying and storage of the blobfile, which is illustratively performed in units of 64 MB blocks, the SYNCer component performs tar and compression operations on the object blocks.

It should be understood that the particular node, tier and component configurations illustrated in FIGS. 3 through 5 are presented by way of illustrative example only, and should not be construed as limiting in any way. Numerous alternative configurations of nodes, front-end storage tiers, back-end storage tiers, data mover modules and other system elements can be used in other embodiments.

Illustrative embodiments disclosed herein can provide a number of significant advantages relative to conventional arrangements.

For example, one or more such embodiments can avoid processing bottlenecks and achieve enhanced throughput performance when processing potentially extremely large numbers of small files containing IoT data. Such an arrangement illustratively streams small IoT data files that are directed to one or more specified directories into a key-value store of a front-end storage tier for combination into an object that includes multiple blocks of an appropriate size for writing to a back-end storage tier. The small files in some embodiments are cached in the key-value store of the front-end tier until a sufficient number of small files are combined to reach the appropriate block size for writing at least a portion of the object to the back-end tier. The portion of the object comprising the combined small files is then copied back to the small file directory, subject to tar and compression operations, and written as a corresponding block to the back-end storage tier. In the case of HDFS, the current maximum block size is 64 MB, and a given object combining multiple small files containing IoT data can comprise multiple such maximum-size blocks. Multiple maximum-size blocks of a given object can be tiered to the back-end storage tier in parallel by one or more data mover modules.

Illustrative embodiments of the invention can be implemented in a wide variety of different IoT contexts, processing any type and arrangement of IoT data provided by distributed sensors, smart appliances, smart automobiles or any other type or arrangement of one or more IoT devices. Examples of IoT contexts in which embodiments can be implemented include tracking of objects, location-based services, public security monitoring, human-centric pervasive computing, and many others. Such contexts can involve very large numbers of IoT devices each sending relatively small files to one or more IoT servers on a regular basis, leading to potentially very large amounts of IoT data to be stored and processed.

For example, consider an information processing system in which shipping containers are tracked from source to destination using IoT data collected from geolocation tags on the containers. Assuming that a ship can transport 1000 containers and location samples are taken at a rate of two per second from each container, 2000 small files having a size less than about 1 KB each will be generated each second. Such samples can be collected by a server on the ship and uploaded to a data center via a communication network. Each such ship will generate approximately 172 M such small files per day, and the data center may need to manage small file streams of this type from potentially hundreds or thousands of ships. Embodiments of the invention can prevent data center processing bottlenecks that might otherwise arise in such a system in which very large numbers of small files containing IoT data are generated. Similar advantages are provided in other contexts involving large amounts of IoT data, such as tracking of passengers within a subway system or other type of transportation system.

Illustrative embodiments also overcome disadvantages of conventional file archiving techniques. For example, conventional file merging approaches such as Hadoop Archive (HAR) files and Hadoop-based Middleware for File System (HMFS) have a limited write throughput due to the use of a centralized write-buffering mechanism. In addition, such conventional arrangements tend to exhibit poor search performance when evaluating IoT related analytics queries on massive amounts of object tracking data or other types of IoT data. For example, in IoT moving-object tracking systems, such as those used by the automotive industry, each moving object is typically detected by multiple sensors. If a file appending policy is used to merge object-tracking files, moving trajectories of an object will be stored in different large files. As a result, it will be necessary to search a substantial number of large files to evaluate IoT moving-object queries, which leads to poor analytics performance for those queries. Embodiments of the invention can avoid these and numerous other drawbacks of HAR, HMFS and other conventional arrangements.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes or other types of nodes, or portions thereof, can be implemented as respective tenants of such a multi-tenant environment.

Back-end storage of a given system disclosed herein can also be implemented at least in part utilizing cloud infrastructure. Examples of cloud-based object stores that can be utilized for back-end storage in some illustrative embodiments include Amazon Web Services (AWS), Simple Storage Service (S3), Google Cloud Platform (GCP) Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system 100, although in other embodiments a given tenant can have multiple containers. The containers may be utilized to implement a variety of different types of functionality within the system 100. For example, containers can be used to implement respective compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of IoT nodes 102, fast tier 106, capacity tier 108, data mover module 110, key-value store 112 and object store 114 are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, nodes, storage tiers, data mover modules, file system directories, key-value stores, object stores and associated processing devices. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a multi-tier storage system comprising at least a front-end storage tier, a back-end storage tier and a data mover module configured to control movement of data between the storage tiers;
the multi-tier storage system being configured to receive a plurality of files;
the front-end storage tier comprising at least one key-value store and a file system comprising at least one specified directory;
wherein the multi-tier storage system is configured to combine multiple ones of the received files written to the at least one specified directory of the file system of the front-end storage tier into an object for storage in association with a key utilized to identify the object in the at least one key-value store;
wherein the object comprises multiple sub-keys identifying respective ones of the multiple files within the object, the multiple sub-keys being sub-keys of the key utilized to identify the object in the at least one key-value store of the front-end storage tier;
wherein the data mover module is configured to copy the object from the at least one key-value store to the at least one specified directory of the front-end storage tier;
wherein the received files are provided to the file system of the front-end storage tier by one or more Internet of Things (IoT) nodes over at least one network, the one or more IoT nodes writing the multiple files each having a file size at or below a specified threshold to said at least one specified directory, said at least one specified directory being designated for files having the file size at or below the specified threshold;
wherein the data mover module comprises a synchronizer service component that accesses the at least one key-value store of the front-end storage tier via a direct memory application programming interface;
wherein the synchronizer service component (i) provides the multiple files to the at least one key-value store via the direct memory application programming interface for combination into the object and (ii) performs at least one of a file collection operation and a compression operation in conjunction with copying of the object from the at least one key-value store to said at least one specified directory; and
wherein the apparatus is implemented using at least one processing device comprising a processor coupled to a memory.

2. The apparatus of claim 1 wherein the received files contain data from respective ones of a plurality of IoT devices coupled to the one or more IoT nodes.

3. The apparatus of claim 1 wherein the object comprises a binary large object and the multiple sub-keys identify respective offsets of the multiple files within the binary large object.

4. The apparatus of claim 1 wherein the data mover module is configured to store the copied object as one or more blocks in the back-end storage tier.

5. The apparatus of claim 4 wherein the file collection operation comprises a tar operation, wherein the data mover module is configured to perform the tar and compression operations in conjunction with storing of the copied object as one or more blocks in the back-end storage tier and wherein the tar and compression operations are applied separately to each of the one or more blocks of the object.

6. The apparatus of claim 4 wherein the back-end storage tier comprises a Hadoop Distributed File System (HDFS) and the object is stored in the back-end storage tier as one or more maximum-size HDFS file blocks.

7. The apparatus of claim 1 wherein the data mover module is configured to identify the multiple files from among the received files as each having the file size at or below the specified threshold and wherein the writing of the multiple files to said at least one specified directory is performed via the data mover module before combining the multiple files into the object.

8. The apparatus of claim 1 wherein the front-end storage tier comprises a fast tier having a relatively high input-output processing speed and a relatively low capacity and the back-end storage tier comprises a capacity tier having a relatively low input-output processing speed and a relatively high capacity.

9. The apparatus of claim 1 wherein the front-end storage tier comprises portions of respective memories of one or more compute nodes or one or more input-output nodes.

10. The apparatus of claim 9 wherein the portions of the respective memories of the one or more compute nodes or the one or more input-output nodes comprise respective flash memories of those nodes.

11. The apparatus of claim 4 wherein the data mover module is configured to retrieve the object from the back-end storage tier into the front-end storage tier with the multiple sub-keys being utilized to access respective ones of the multiple files of the object.

12. The apparatus of claim 1 wherein the object is made accessible to a given analytics application running on a compute node via a corresponding dynamically loadable namespace identifier.

13. An information processing system comprising the apparatus of claim 1 and the one or more IoT nodes each of which communicates with the multi-tier storage system over the at least one network.

14. A method comprising:
receiving a plurality of files in a multi-tier storage system comprising at least a front-end storage tier, a back-end storage tier and a data mover module configured to control movement of data between the storage tiers;
combining multiple ones of the received files written to at least one specified directory of a file system of the front-end storage tier into an object for storage in association with a key utilized to identify the object in a key-value store of the front-end storage tier; and copying the object from the key-value store to said at least one specified directory of the front-end storage tier;

wherein the object comprises multiple sub-keys identifying respective ones of the multiple files within the object, the multiple sub-keys being sub-keys of the key utilized to identify the object in the key-value store of the front-end storage tier;

wherein the received files are provided to the file system of the front-end storage tier by one or more Internet of Things (IoT) nodes over at least one network, the one or more IoT nodes writing the multiple files each having a file size at or below a specified threshold to said at least one specified directory, said at least one specified directory being designated for files having the file size at or below the specified threshold;

wherein the data mover module comprises a synchronizer service component that accesses the key-value store of the front-end storage tier via a direct memory application programming interface;

wherein the synchronizer service component (i) provides the multiple files to the key-value store via the direct memory application programming interface for combination into the object and (ii) performs at least one of a file collection operation and a compression operation in conjunction with the copying of the object from the key-value store to said at least one specified directory; and wherein the steps of the method are performed by at least one processing device comprising a processor coupled to a memory.

15. The method of claim 14 further comprising:

storing the copied object as one or more blocks in the back-end storage tier.

16. A non-transitory processor-readable storage medium having stored therein program code of one or more software programs, wherein the program code when executed by at least one processing device causes said processing device:

to receive a plurality of files in a multi-tier storage system comprising at least a front-end storage tier, a back-end storage tier and a data mover module configured to control movement of data between the storage tiers;

to combine multiple ones of the received files written to at least one specified directory of a file system of the front-end storage tier into an object for storage in association with a key utilized to identify the object in a key-value store of the front-end storage tier; and to copy the object from the key-value store to said at least one specified directory of the front-end storage tier;

wherein the object comprises multiple sub-keys identifying respective ones of the multiple files within the object, the multiple sub-keys being sub-keys of the key utilized to identify the object in the key-value store of the front-end storage tier;

wherein the received files are provided to the file system of the front-end storage tier by one or more Internet of Things (IoT) nodes over at least one network, the one or more IoT nodes writing the multiple files each having a file size at or below a specified threshold to said at least one specified directory, said at least one specified directory being designated for files having the file size at or below the specified threshold;

wherein the data mover module comprises a synchronizer service component that accesses the key-value store of the front-end storage tier via a direct memory application programming interface; and wherein the synchronizer service component (i) provides the multiple files to the key-value store via the direct memory application programming interface for combination into the object and (ii) performs at least one of a file collection operation and a compression operation in conjunction with the copying of the object from the key-value store to said at least one specified directory.

17. The processor-readable storage medium of claim 16 wherein the program code when executed by at least one processing device further causes said processing device:

to store the copied object as one or more blocks in the back-end storage tier.

18. The processor-readable storage medium of claim 17 wherein the file collection operation comprises a tar operation, wherein the data mover module is configured to perform the tar and compression operations in conjunction with storing of the copied object as one or more blocks in the back-end storage tier and wherein the tar and compression operations are applied separately to each of the one or more blocks of the object.

19. The method of claim 14 wherein the object comprises a binary large object and the multiple sub-keys identify respective offsets of the multiple files within the binary large object.

20. The method of claim 15 wherein the file collection operation comprises a tar operation, wherein the data mover module is configured to perform the tar and compression operations in conjunction with the storing of the copied object as one or more blocks in the back-end storage tier and wherein the tar and compression operations are applied separately to each of the one or more blocks of the object.

* * * * *